United States Patent
Kang et al.

(10) Patent No.: US 12,150,132 B2
(45) Date of Patent: *Nov. 19, 2024

(54) METHOD AND APPARATUS FOR UPLINK TRANSMISSION AND RECEPTION IN WIRELESS COMMUNICATION SYSTEM

(71) Applicant: LG ELECTRONICS INC., Seoul (KR)

(72) Inventors: Jiwon Kang, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/009,707

(22) PCT Filed: Jun. 22, 2021

(86) PCT No.: PCT/KR2021/007805
§ 371 (c)(1),
(2) Date: Dec. 9, 2022

(87) PCT Pub. No.: WO2021/261879
PCT Pub. Date: Dec. 30, 2021

(65) Prior Publication Data
US 2023/0247625 A1    Aug. 3, 2023

(30) Foreign Application Priority Data

Jun. 23, 2020   (KR) .................. 10-2020-0076805

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0048* (2013.01); *H04L 5/0053* (2013.01); *H04W 16/28* (2013.01);
(Continued)

(58) Field of Classification Search
CPC . H04W 72/1268; H04L 5/0048; H04L 5/0053
(Continued)

(56) References Cited

U.S. PATENT DOCUMENTS

2019/0158348 A1* 5/2019 Liou .................... H04L 41/0816
2020/0351674 A1* 11/2020 Zhou .................... H04W 76/19
(Continued)

FOREIGN PATENT DOCUMENTS

CN          110113817         8/2019
CN          111093219         5/2020
(Continued)

OTHER PUBLICATIONS

Korean Intellectual Property Office Application No. 10-2022-7037322, Notice of Allowance dated Mar. 23, 2023, 6 pages.
(Continued)

*Primary Examiner* — Chi Tang P Cheng
(74) *Attorney, Agent, or Firm* — LEE, HONG, DEGERMAN, KANG & WAIMEY

(57) ABSTRACT

Disclosed are a method and an apparatus for uplink transmission and reception in a wireless communication system. A method of performing uplink transmission initiated by a terminal in a wireless communication system according to an embodiment of the present disclosure may include receiving, from a base station, configuration information including multiple uplink transmission resources related to a triggering event; and based on the triggering event for the uplink transmission, performing the uplink transmission to the base station in a transmission occasion, based on a first uplink (Continued)

transmission resource or a second uplink transmission resource of the multiple uplink transmission resources, wherein the first uplink transmission resource is related to a first control resource set (CORESET) group, and the second uplink transmission resource is related to a second CORESET group.

9 Claims, 13 Drawing Sheets

(51) Int. Cl.
  *H04W 16/28* (2009.01)
  *H04W 72/1263* (2023.01)
  *H04W 72/1268* (2023.01)
(52) U.S. Cl.
  CPC ... *H04W 72/1263* (2013.01); *H04W 72/1268* (2013.01)
(58) Field of Classification Search
  USPC .......................................................... 370/329
  See application file for complete search history.

(56) References Cited

U.S. PATENT DOCUMENTS

| | | | |
|---|---|---|---|
| 2021/0028849 A1* | 1/2021 | Chin | H04B 7/0695 |
| 2022/0302989 A1* | 9/2022 | Zhang | H04W 72/044 |

FOREIGN PATENT DOCUMENTS

| | | |
|---|---|---|
| KR | 20190029535 | 3/2019 |
| WO | 2020048443 | 3/2020 |
| WO | 2020059150 | 3/2020 |
| WO | 2020031389 | 8/2021 |

OTHER PUBLICATIONS

Vivo, "Remaining issues on multi-beam transmission", R1-1912040, 3GPP TSG RAN WG1 #99, Nov. 2019, 10 pages.
ZTE, "Enhancements on multi-beam operation", R1-1910285, 3GPP TSG RAN WG1 Meeting #98bis, Oct. 2019, 24 pages.
Apple Inc., "Feature Lead Summary on SCell BFR and L1-SINR", R1-1913372/R1-1913457, 3GPP TSG RAN WG1 #99, Nov. 2019, 30 pages.
MediaTek Inc., "Summary 3 on Remaing issues on Beam Failure Recovery", R1-1805730, 3GPP TSG RAN WG1 Meeting #92bis, Apr. 2018, 25 pages.
Japan Patent Office Application No. 2022-567760, Office Action dated Oct. 10, 2023, 3 pages.
LG Electronics, "Feature lead summary#4 of Enchancements on Multi-beam Operations", R1-1909779, 3GPP TSG RAN WG1 Meeting #98, Aug. 2019, 38 pages.
Lenovo, Motorola Mobility, "SR configuration for SCell beam failure recovery", R2-2002926, 3GPP TSG-RAN WG2 Meeting #109bis-e, Apr. 2020, 4 pages.
LG Electronics, "TP for capturing outcome of email thread [101-e-NR-eMIMO-MB1-03]" 3GPP TSG-RAN WG1 #101, e-Meeting, R1-2004795, Jun. 2020, 5 pages.
AT&T, "Summary of email discussion/approval [101-e-NR-eMIMO-UEFeature-01]" 3GPP TSG-RAN WG1 #101, e-Meeting, R1-2005033, Jun. 2020, 19 pages.
PCT International Application No. PCT/KR2021/007805, International Search Report dated Oct. 5, 2021, 5 pages.
European Patent Office Application Serial No. 21829515.2, Search Report dated May 28, 2024, 11 pages.

* cited by examiner

METHOD AND APPARATUS FOR UPLINK TRANSMISSION AND RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2021/007805, filed on Jun. 22, 2021, which claims the benefit of earlier filing date and right of priority to Korean Application No. 10-2020-0076805, filed on Jun. 23, 2020, the contents of which are all incorporated by reference herein in their entireties.

TECHNICAL FIELD

The present disclosure relates to a wireless communication system, and in more detail, relates to a method and a device of transmitting and receiving an uplink in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device for uplink transmission and reception initiated by a terminal in a wireless communication system.

An additional technical problem of the present disclosure is to provide a method and a device of configuring a spatial parameter and/or a pathloss reference signal for UE-initiated uplink transmission in a wireless communication system.

An additional technical problem of the present disclosure is to provide a method and a device of configuring a plurality of spatial parameter candidates and/or a plurality of pathloss reference signal candidates for UE-initiated uplink transmission at a specific transmission occasion and performing uplink transmission and reception at a specific transmission occasion by applying one spatial parameter and/or one pathloss reference signal of them in a wireless communication system.

The technical objects to be achieved by the present disclosure are not limited to the above-described technical objects, and other technical objects which are not described herein will be clearly understood by those skilled in the pertinent art from the following description.

A method of performing uplink transmission initiated by a terminal in a wireless communication system according to an aspect of the present disclosure includes receiving from a base station configuration information including at least one of a plurality of spatial parameter candidates or a plurality of pathloss reference signal (PL RS) candidates associated with each of at least one transmission occasion for the uplink transmission; and performing the uplink transmission to the base station at each of the at least one transmission occasion based on at least one of one spatial parameter among the plurality of spatial parameter candidates or one PL RS among the plurality of PL RS candidates based on a triggering event for the uplink transmission, and at least one of the plurality of spatial parameter candidates or the plurality of PL RS candidates may be configured for one uplink transmission resource mapped to the triggering event or may be configured for a plurality of uplink transmission resources mapped to the triggering event.

A method of receiving uplink transmission initiated by a terminal by a base station in a wireless communication system according to an additional aspect of the present disclosure includes transmitting to a terminal configuration information including at least one of a plurality of spatial parameter candidates or a plurality of pathloss reference signal (PL RS) candidates associated with each of at least one transmission occasion for the uplink transmission; and receiving from the terminal the uplink transmission at each of the at least one transmission occasion based on at least one of one spatial parameter among the plurality of spatial parameter candidates or one PL RS among the plurality of PL RS candidates based on a triggering event for the uplink transmission, and at least one of the plurality of spatial parameter candidates or the plurality of PL RS candidates may be configured for one uplink transmission resource mapped to the triggering event or may be configured for a plurality of uplink transmission resources mapped to the triggering event.

According to the present disclosure, in a technical problem of the present disclosure, a method and a device for uplink transmission and reception initiated by a terminal in a wireless communication system may be provided.

According to the present disclosure, a method and a device of configuring a spatial parameter and/or a pathloss reference signal for UE-initiated uplink transmission in a wireless communication system may be provided.

According to the present disclosure, a method and a device of configuring a plurality of spatial parameter candidates and/or a plurality of pathloss reference signal candidates for UE-initiated uplink transmission in a specific transmission occasion and performing uplink transmission and reception in a specific transmission occasion by applying one spatial parameter and/or one pathloss reference signal of them in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
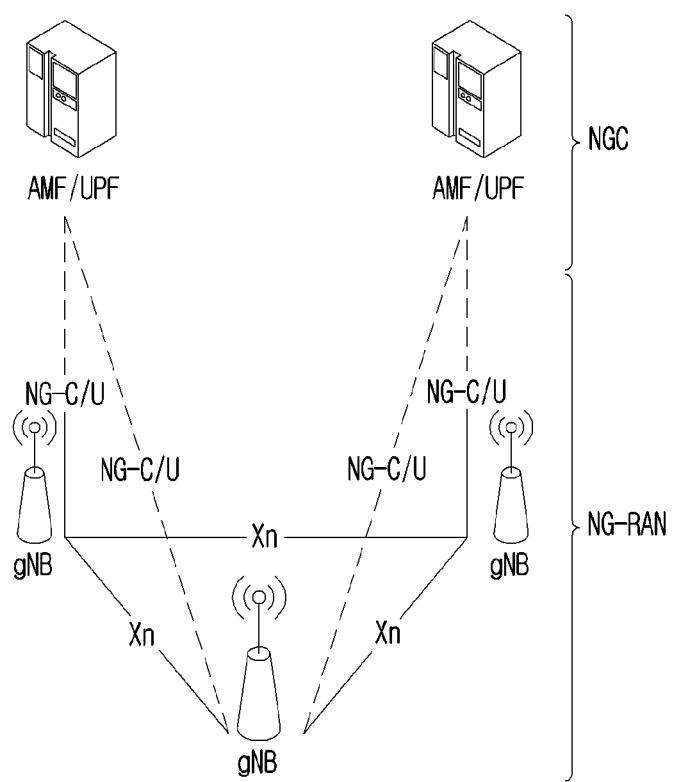
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
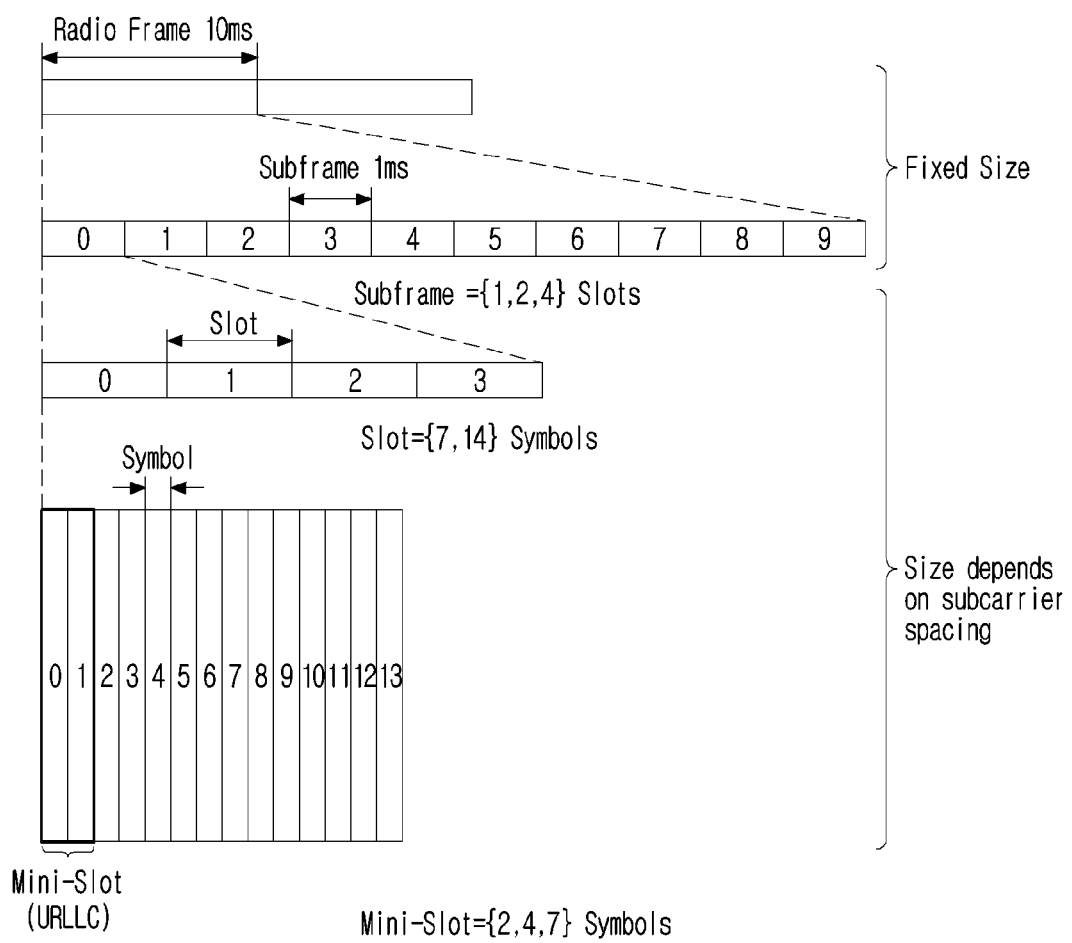
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
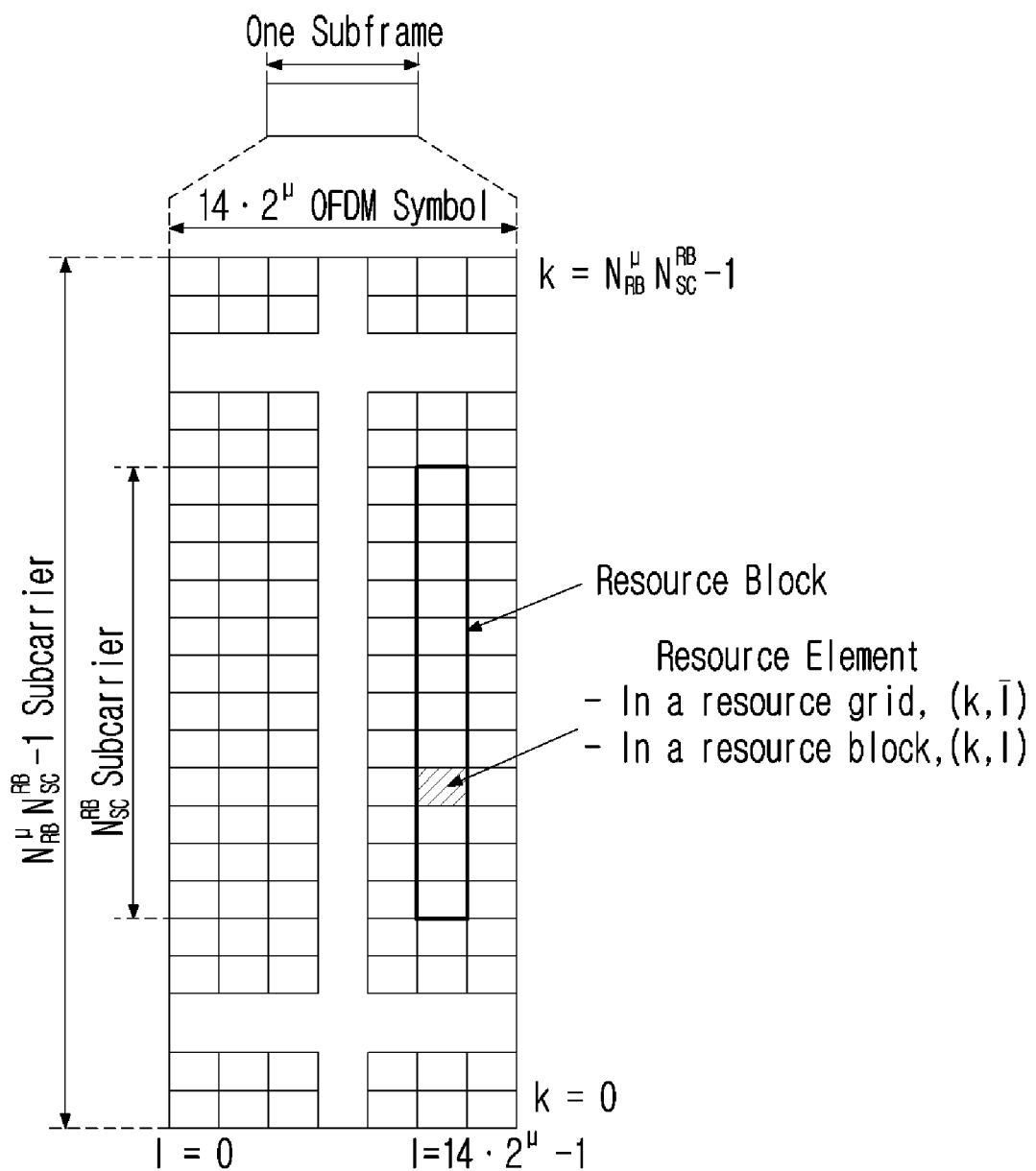
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, ..., $N_{RB}^\mu N_{sc}^{RB}-1$ is an index in a frequency domain and l'=0, ..., $2^\mu N_{symb}^{(\mu)}-1$ refers to a position of a symbol in a subframe. When referring to a resource element in a slot, an index pair (k,l) is used. Here, l=0, ..., $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radiofrequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \qquad \text{[Equation 2]}$$

$N_{BWP,i}^{start,\mu}$ is a common resource block that a BWP starts relatively to common resource block 0.

Figure 4:
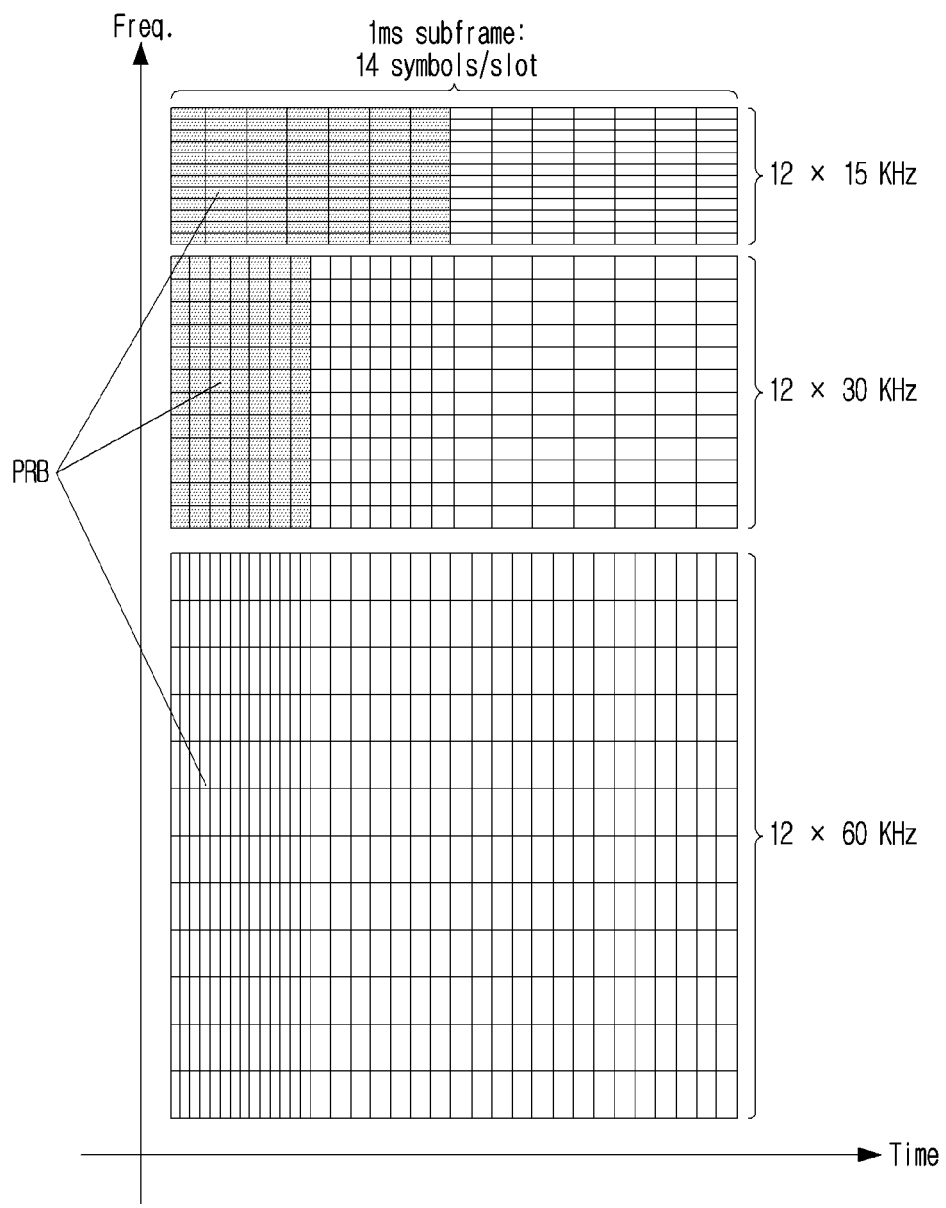
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
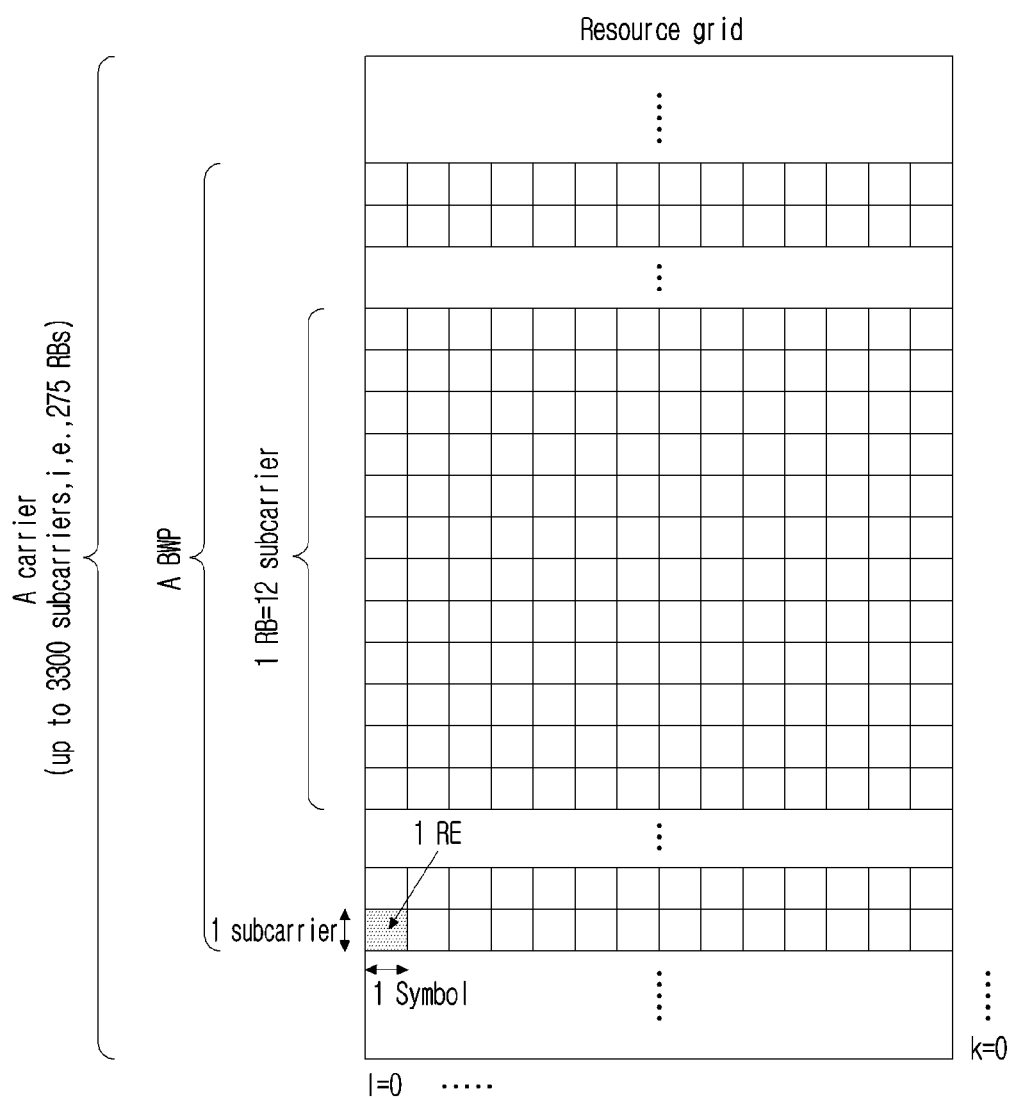
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
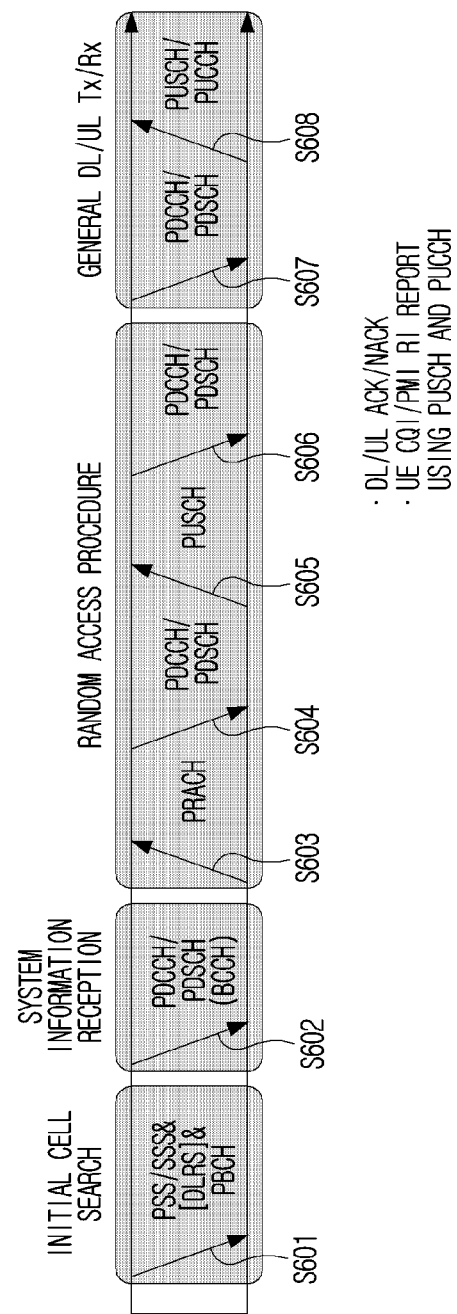
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N(ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
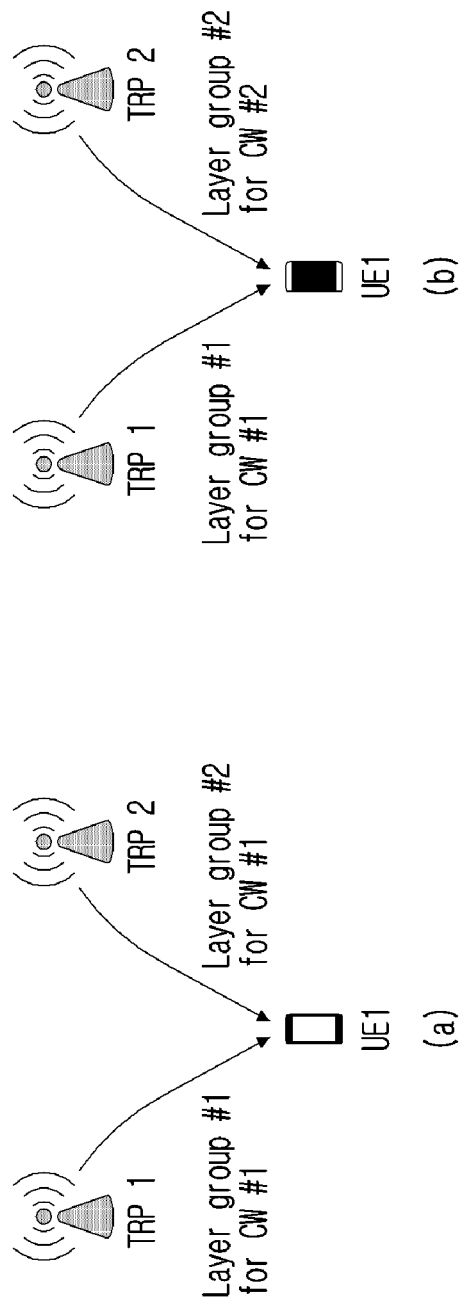
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and frequency resource allocation is overlapped and n (n<=Ns) TCI states in a single slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency resource allocation is not overlapped and n (n<=Nf) TCI states in a single slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time resource allocation is not overlapped and n (n<=Nt1) TCI states in a single slot Each transmission time (occasion) of a TB has time granularity of a mini-slot and has one TCI and one RV.

A common MCS is used with a single or multiple DMRS port(s) at every transmission time (occasion) in a slot.

A RV/TCI may be the same or different at a different transmission time (occasion).

4) Method 4 (TDM): n (n<=Nt2) TCI states in K (n<=K) different slots

Each transmission time (occasion) of a TB has one TCI and one RV.

Every transmission time (occasion) across K slots uses a common MCS with a single or multiple DMRS port(s).

A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a time domain resource assignment (TDRA) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

A proposal of the present disclosure may be extended and applied to both a case in which various uplink/downlink channels are repetitively transmitted to a different time/frequency/space resource and a case in which various uplink/downlink channels are partitively transmitted to a different time/frequency/space resource.

Uplink Power Control

In a wireless communication system, it may be necessary to increase or decrease transmission power of a terminal (e.g., user equipment (UE)) and/or a mobile device according to a situation. As such, controlling transmission power of a terminal and/or a mobile device may be referred to as uplink power control. In an example, a transmission power control method may be applied to satisfy a requirement of a base station (e.g., gNB, eNB, etc.) (e.g., a SNR (Signal-to-Noise Ratio), a BER (Bit Error Ratio), a BLER (Block Error Ratio), etc.).

Power control as described above may be performed by an open-loop power control method and a closed-loop power control method.

Specifically, an open-loop power control method means a method of controlling transmission power without a feedback from a transmission device (e.g., a base station, etc.) to a reception device (e.g., a terminal, etc.) and/or a feedback from a reception device to a transmission device. In an example, a terminal may receive a specific channel/signal (a pilot channel/signal) from a base station and estimate strength of received power by using it. Subsequently, a terminal may control transmission power by using strength of estimated received power.

Unlike it, a closed-loop power control method means a method of controlling transmission power based on a feedback from a transmission device to a reception device and/or a feedback from a reception device to a transmission device. In an example, a base station receives a specific channel/signal from a terminal and determines the optimum power level of a terminal based on a power level, a SNR, a BER, a BLER, etc. measured by a received specific channel/signal. A base station delivers information on a determined optimum power level (i.e., a feedback) to a terminal through a control channel, etc. and a corresponding terminal may control transmission power by using a feedback provided by a base station.

Hereinafter, for convenience of a description, a power control method will be described based on a case in which a terminal performs PUCCH transmission. Of course, a corresponding method may be also extended and applied to other uplink channel supported in a wireless communication system.

Specifically, by using a PUCCH power control adjustment state based on index l, for PUCCH transmission in an active uplink bandwidth part (UL BWP) of carrier index f of serving cell (e.g., PCell or SCell) index c, a terminal may determine PUCCH transmission power $P_{PUCCH,b,f,c}(i,q_u,q_d,l)$ (dBm) in PUCCH transmission occasion index i based on the following Equation 3.

[Equation 3]

$$P_{PUCCH,b,f,c}(i, q_u, q_d, l) = \min\left\{\begin{array}{l} P_{CMAX,f,c}(i), \\ P_{O\_PUCCH,b,f,c}(q_u) + \\ 10\log_{10}(2^\mu \cdot M_{RB,b,f,c}^{PUCCH}(i)) + \\ PL_{b,f,c}(q_d) + \\ \Delta_{F\_PUCCH}(F) + \\ \Delta_{TF,b,f,c}(i) + g_{b,f,c}(i, l) \end{array}\right\}[dBm]$$

In Equation 3, $q_u$ represents an index for an open-loop power control parameter (e.g., Po, etc.) and up to 8 parameter values may be configured per cell. Index $q_{-d}$ represents an index of a DL RS resource for pathloss (PL) measurement (e.g., $PL_{b,f,c}(q_d)$) and up to 4 measured values may be configured per cell. Index l represents an index for a closed-loop power control process and up to 2 processes may be configured per cell.

Specifically, as Po (e.g., $P_{O\_PUCCH,b,f,c}(q_u)$) is a parameter broadcast as part of system information, it may represent target received power in a reception side. A corresponding Po value may be configured by considering throughput of a terminal, capacity of a cell, noise and/or interference, etc. In addition, $P_{CMAX,f,c}(i)$ may represent configured terminal transmission power. In an example, the configured terminal transmission power may correspond to 'configured maximum UE output power'. In addition, $M^{PUCCH}_{RB,b,c}(i)$ may represent bandwidth of PUCCH resource allocation expressed as the number of resource blocks (RB) for a PUCCH transmission occasion based on subcarrier spacing (μ). In addition, a delta function (e.g., $\Delta_{P\_PUCCH}(F)$ $\Delta_{TF,b,f,c}(i)$) may be configured by considering a PUCCH format (e.g., PUCCH format 0, 1, 2, 3, 4, etc.). In addition, $g_{b,f,c}(i,l)$ related to a PUCCH power control adjustment state may be configured or indicated based on a TPC command field of DCI detected or received by a terminal (e.g., DCI format 1_0, 1_1, 2_2, etc.).

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate a connection between a PUCCH resource and the above-described index $q_u$, $q_d$, l. In an example, a PUCCH spatial relation Activation/Deactivation command in a MAC-CE may activate or deactivate a connection between a PUCCH resource and the above-described index $q_u$, $q_d$, l based on a RRC parameter, PUCCH-SpatialRelationInfo. In other words, the above-described index $q_u$, $q_d$, l, etc. may be associated with a beam, a panel and/or a spatial domain transmission filter, etc. based on specific information. Thereby, PUCCH transmission power control in a unit of a beam, a panel and/or a spatial domain transmission filter may be performed.

Parameters and/or information for the above-described PUCCH power control may be configured individually (i.e., independently) per BWP. In this case, corresponding parameters and/or information may be configured or indicated through higher layer signaling (e.g., RRC signaling, a MAC-CE, etc.) and/or DCI, etc. In an example, a parameter and/or information for PUCCH power control may be transmitted through RRC signaling PUCCH-ConfigCommon, PUCCH-PowerControl, etc. and PUCCH-CopnfigCommon, PUCCH-PowerControl may be configured as in the following Table 6.

Additionally, in NR MIMO Rel-15, for an uplink (UL channel)/a RS (e.g., a PUSCH, a PUCCH, a SRS) of a terminal, a base station may use an open-loop power control parameter for pathloss compensation to configure a DL RS (i.e., a pathloss reference RS or for short, a pathloss RS or a PL RS). In addition, only for a PUCCH, the pathloss RS may be updated by updating a PUCCH spatial relation information identifier (PUCCH-SpatialRelationInfoId) through a MAC control element (CE) message for each PUCCH resource.

Additionally, a pathloss RS may be updated also for a PUSCH/a SRS through an individual MAC CE message.

Beam Failure Recovery

In performing a DL/UL beam management process, a beam mismatch problem may occur according to a configured beam management cycle. In particular, when a terminal moves or revolves or when a wireless channel environment is changed by the movement of a surrounding object (e.g., a beam is blocked to change a LoS (line-of sight) environment into a Non-LoS environment), the optimum DL/UL beam pair may be changed. Due to such a change, when tracking fails in a beam management process generally performed by a network indication, a beam failure event may be considered to occur. Whether such a beam failure event occurs may be determined by a terminal through reception quality of a downlink reference signal (RS). And,

TABLE 6

```
PUCCH-ConfigCommon :: =        SEQUENCE {
   pucch-ResourceCommon             INTEGER (0..15)
   pucch-GroupHopping                       ENUMERATED { neither, enable,
disable },
   hoppingId                        INTEGER (0..1023)
   p0-nominal                       INTEGER (-202. .24 )
   ...
}
PUCCH-PowerControl ::=         SEQUENCE {
   deltaF-PUCCH-f0                  INTEGER (-16..15)
   deltaF-PUCCH-f1                  INTEGER (-16..15)
   deltaF-PUCCH-f2                  INTEGER (-16..15)
   deltaF-PUCCH-f3                  INTEGER (-16..15)
   deltaF-PUCCH-f4                  INTEGER (-16..15)
   p0-Set                           SEQUENCE (SIZE (1..maxNrofPUCCH-P0-
PerSet)) OF P0-PUCCH
   pathlossReferenceRSs                      SEQUENCE (SIZE (1..maxNrofPUCCH-
PathlossReferenceRSs)) OF PUCCH-PathlossReferenceRS
   twoPUCCH-PC-AdjustmentStates          ENUMERATED (twoStates)
   ...
}
P0-PUCCH ::=                   SEQUENCE {
   p0-PUCCH-Id                          P0-PUCCH-Id,
   p0-PUCCH-Value                       INTEGER (-16..15)
}
P0-PUCCH-Id ::=                INTEGER (1..8)
PUCCH-PathlossReferenceRS ::=            SEQUENCE {
   pucch-PathlossReferenceRS-Id             PUCCH-PathlossReferenceRS-
Id,
   referenceSignal                  CHOICE {
      ssb-Index                         SSB-Index,
      csi-RS-Index                      NZP-CSI-RS-ResourceId
   }
}
```

Through a method as described above, a terminal may determine or calculate PUCCH transmission power and transmit a PUCCH by using determined or calculated PUCCH transmission power.

The above-described example is about uplink power control for a PUCCH and power control for a PUSCH, a SRS, a PRACH may be performed by a method which is not the same as, but similar to it.

a reporting message for such a situation or a message for a beam recovery request (referred to as a BFRQ (beam failure recovery request) message) should be transmitted from a terminal. A base station which received such a beam failure recovery request message may perform beam recovery through a variety of processes such as beam RS transmission, beam reporting request, etc. for beam recovery. These series of beam recovery processes are referred to as beam failure recovery (BFR). A Rel-15 NR standardized a BFR (beam failure recovery) process for a primary cell (PCell) or a primary secondary cell (PScell) (the two are collectively referred to as a special cell (SpCell)) that a contention based PRACH resource always exists. As an operation in a serving cell, a corresponding BFR procedure is configured as follows with a beam failure detection (BFD) process of a terminal, a BFRQ process, and a process in which a terminal monitors a response of a base station to a BFRQ.

Figure 8:
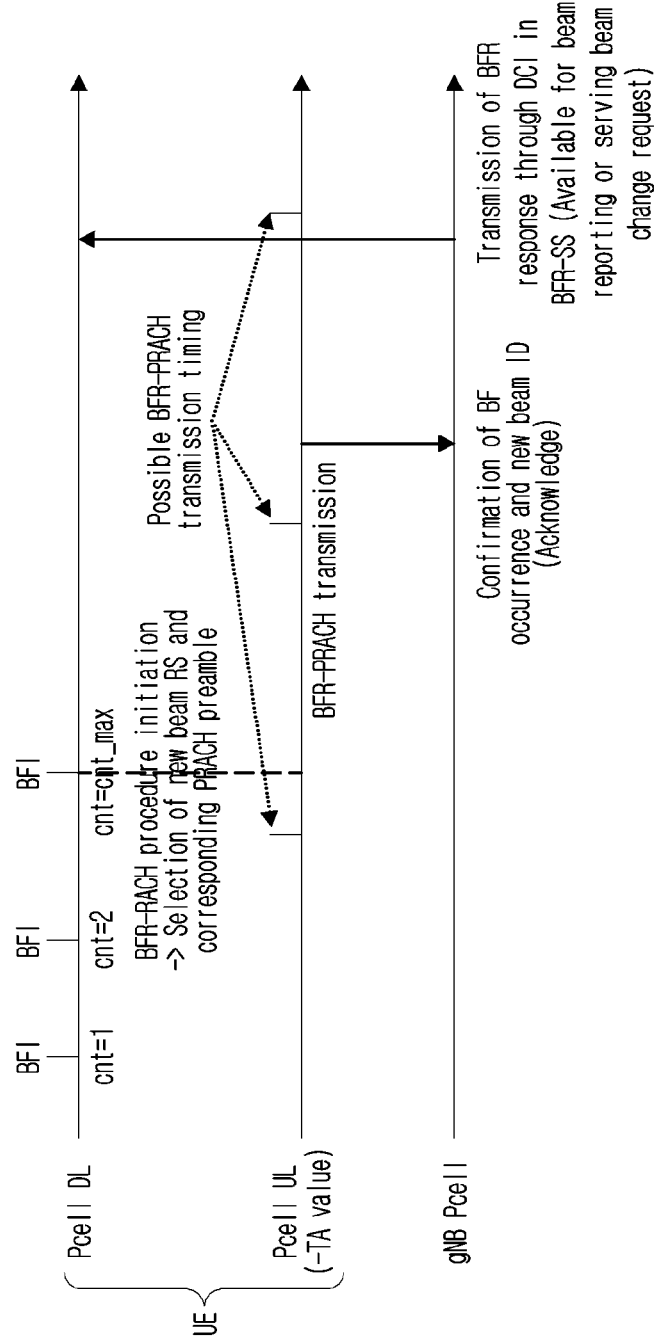
FIG. 8 is a diagram which illustrates a beam failure recovery operation for a Pcell in a wireless communication system to which the present disclosure may be applied.

FIG. 8 is a diagram which illustrates a beam failure recovery operation for a Pcell in a wireless communication system to which the present disclosure may be applied Hereinafter, in reference to FIG. 8 a beam failure recovery operation is described.

1) BFD (Beam failure detection)

When all PDCCH beams fall below a predetermined quality value (Q_out), it is said that one beam failure instance occurred. Here, quality is based on a hypothetical block error rate (BLER). In other words, it means a probability of a failure in demodulation of corresponding information when it is assumed that control information was transmitted to a corresponding PDCCH.

Here, one or a plurality of search spaces for monitoring a PDCCH may be configured to a terminal. Here, a beam may be differently configured per each search space. In this case, it means a case that all PDCCH beams for all search spaces fall below a BLER threshold. As a method for a terminal to determine a BFD RS, the following two methods are supported.

An implicit configuration for BFD RS(s): a CORESET (control resource set) ID (identifier), a resource region where a PDCCH may be transmitted, is configured in each search space. And, QCLed (Quasi Co-located) RS information for a spatial RX parameter (e.g., a CSI-RS resource ID, a SSB ID) may be indicated/configured per each CORESET ID. For example, a QCLed RS is indicated/configured by a TCI (transmit configuration information) indication in a NR standard. Here, a QCLed RS for a spatial RX parameter (e.g., QCL type D in TS38.214) means that a base station informs that a terminal equally uses (or may use) a beam used to receive a corresponding spatially QCLed RS (i.e., use the same spatial domain filter for reception) in receiving a corresponding PDCCH DMRS. Finally, from a viewpoint of a base station, it is a method of informing a terminal that transmission will be performed by applying the same transmission beam or a similar transmission beam (e.g., when a beam direction is same/similar, but a beam width is different) between spatially QCLed antenna ports. In other words, as described above, a terminal may determine (i.e., consider as the 'all PDCCH beams') as a BFD RS a QCLed (Quasi Co-located) RS for a spatial RX parameter configured to a CORESET for PDCCH reception.

An explicit configuration for BFD RS(s): a base station may explicitly configure beam RS(s) to a terminal for the purpose (beam failure detection). In this case, corresponding configured beam RS(s) correspond to the 'all PDCCH beams'.

Whenever an event occurs that a hypothetical BLER measured based on BFD RS(s) deteriorates over a specific threshold, a physical layer of a terminal informs a MAC sublayer that a beam failure instance (BFI) occurred. In a MAC sublayer of a terminal, when as many BFIs as the certain number of times (e.g., a value of a higher layer parameter, beamFailureInstanceMaxCount) occur within a certain time (i.e., within a BFD timer), a beam failure is determined (considered) to occur and a relevant RACH operation is initiated.

A MAC object operates as follows:

1> If a BFI is received from a lower layer (e.g., a physical layer):

2> Start or restart a BFD timer (beamFailureDetectionTimer);

2> Increase (increment) a BFI counter (BFI_COUNTER) by 1;

2> If a BFI counter (BFI_COUNTER) is equal to or greater than the maximum count (number of times) of BFIs (beamFailureInstanceMaxCount):

3> Initiate a Random Access procedure in a SpCell (refer to the above-described Random Access related procedure).

1> If a BFD timer (beamFailureDetectionTimer) is expired; or

1> If a BFD timer (beamFailureDetectionTimer), the maximum count (number of times) of BFIs (beamFailureInstanceMaxCount), or any reference signals used for beam failure detection is reconfigured by a higher layer (e.g., a RRC layer):

2> Set a BFI counter (BFI_COUNTER) as 0.

1> If a Random Access procedure is successfully completed:

2> Set a BFI counter (BFI_COUNTER) as 0;

2> If configured, stop a beam failure recovery timer (beamFailureRecoveryTimer);

2> Consider that a Beam Failure Recovery procedure was successfully completed 2) (PRACH based) Beam Failure Recovery Request (BFRQ): New Beam Identification+PRACH Transmission As described in 1) Beam Failure Detection (BFD), when a certain number of BFIs or more occur, a terminal may determine that a beam failure occurred and perform a beam failure recovery operation. As an example of a Beam failure recovery operation, a beam failure recovery request (BFRQ) operation based on a RACH procedure (i.e., a PRACH) may be performed. Hereinafter, a corresponding BFRQ procedure is described in detail.

A base station may configure a RS list (e.g., candidateBeamRSList) corresponding to candidate beams which may be substituted when a beam failure (BF) occurs through higher layer signaling (e.g., RRC) for a corresponding terminal. In addition, dedicated PRACH resources may be configured for corresponding candidate beams. Here, dedicated PRACH resources are non-contention based PRACH (also referred to as contention free PRACH) resources. If a terminal does not find a (proper) beam in a corresponding list, a terminal selects a contention based PRACH among preconfigured SSB resources and transmits it to a base station. A specific procedure is as follows.

Step 1) A terminal finds a beam with more than a predetermined quality value (Q_in) among RSs configured by a base station as a candidate beam RS set.

If one beam RS exceeds a threshold, a terminal selects a corresponding beam RS.

If a plurality of beam RSs exceeds a threshold, a terminal selects any one of corresponding beam RSs.

If no beam exceeds a threshold, a terminal performs the following step 2.

Here, beam quality may be based on a RSRP.

In addition, a RS beam set configured by the base station may include the following three cases. For example, all beam RSs in a RS beam set may be configured with SSBs. Alternatively, all beam RSs in a RS beam set may be configured with CSI-RS resources. Alternatively, beam RSs in a RS beam set may be configured with SSBs and CSI-RS resources.

Step 2) A terminal finds a beam with more than a predetermined quality value (Q_in) or more among SSBs (associated with a contention based PRACH resource).

If one SSB exceeds a threshold, a terminal selects a corresponding beam RS.

If a plurality of SSBs exceeds a threshold, a terminal selects any one of corresponding beam RSs.

If no beam exceeds a threshold, a terminal performs the following step 3.

Step 3) A terminal selects any SSB among SSBs (associated with a contention based PRACH resource).

A terminal transmits to a base station a preamble and a PRACH resource which is directly or indirectly associated and configured with a beam RS (CSI-RS or SSB) selected in the process.

Here, a direct association configuration is used in the following case.

When a contention-free PRACH resource and a preamble are configured for a specific RS in a candidate beam RS set which is separately configured for BFR When a preamble and a (contention based) PRACH resource mapped one-to-one with SSBs which are commonly configured for other purposes such as random access, etc. are configured Alternatively, here, an indirect association configuration is used in the following case.

When a contention-free PRACH resource and a preamble are not configured for a specific CSI-RS in a candidate beam RS set which is separately configured for BFR Here, a terminal selects a preamble and a (contention free) PRACH resource associated with a SSB (i.e., QCLed (quasi-co-located) with respect to a spatial Rx parameter) designated to be receivable with the same Rx beam as a corresponding CSI-RS.

3) Monitoring of a response of a base station to a BFRQ

A terminal monitors a response of a base station (gNB) to corresponding PRACH transmission.

Here, a response to the contention-free PRACH resource and preamble is transmitted to a PDCCH masked by a C-RNTI and a response is received in a search space (SS) which is separately configured by RRC for BFR.

Here, the search space is configured for a specific CORESET (for BFR).

For a response to a Contention PRACH, a search space and a CORESET (e.g., CORESET 0 or CORESET 1) configured for a general contention PRACH based random access process are reused as they are.

If there is no response for a certain period of time, 2) a process of identifying and selecting a new beam, and 3) a process of monitoring a response of a base station and a BFRQ are repeated.

The process may be performed until PRACH transmission reaches the preconfigured maximum number of times (N_max) or a configured timer (BFR timer) expires.

If the timer expires, a terminal stops contention free PRACH transmission, but may perform contention based PRACH transmission by a SSB selection until N_max is reached.

UE-Initiated Uplink Transmission

The present disclosure describes a method of providing/indicating to a terminal a transmission configuration which may be applied to uplink transmission initiated by a terminal (i.e., UE-initiated uplink transmission).

UE-initiated uplink transmission may be distinguished from uplink transmission scheduled by a network/a base station. For example, UE-initiated uplink transmission may include event-based (or event-triggered) uplink transmission. For example, an event may include a scheduling request (SR), a beam failure recovery request (BFRQ), or a consistent LBT (listen-before-talk) failure, etc. Here, LBT means a method that in an unlicensed band, a terminal initiates (i.e., talks) transmission if a wireless medium is not occupied for predetermined time after checking (i.e., listening) whether a wireless medium can be occupied by other entity and for a consistent LBT failure, a terminal may transmit a scheduling request for uplink transmission to a base station.

A transmission configuration for UE-initiated uplink transmission may include a configuration for at least one of a spatial parameter or a pathloss reference RS (PL reference RS or PL RS).

In the following example, a term of "spatial parameter" may refer to a beam transmission and reception related parameter referred to for downlink reception or uplink transmission of a terminal.

For example, a spatial parameter related to downlink transmission and reception may include QCL information which is applied to a physical channel that downlink control information or data is transmitted and received or which is assumed by a terminal. QCL information may include QCL RS information and QCL RS information may be configured per QCL type (e.g., QCL type A/B/C/D). For example, downlink control information (DCI) may be transmitted and received through a PDCCH and a spatial parameter related to DCI transmission and reception may include QCL reference information, TCI state information, etc. for PDCCH DMRS antenna port(s). In addition, downlink data may be transmitted and received through a PDSCH and a spatial parameter related to downlink data transmission and reception may include QCL reference information, TCI state information, etc. for PDSCH DMRS antenna port(s).

But, in the present disclosure, a term of spatial parameter is not limited to QCL information and may include a spatial parameter applied to uplink transmission (e.g., spatial relation information (spatial relation info) related to an uplink transmission beam). For example, uplink control information (UCI) may be transmitted and received through a PUCCH and/or a PUSCH and a spatial parameter related to UCI transmission and reception may include a PRI (PUCCH resource indicator) related to PUCCH/PUSCH transmission and reception, spatial relation info or a QCL reference RS related thereto, etc.

In addition, a spatial parameter may be separately configured for a downlink or an uplink or may be integrated and configured for a downlink and an uplink.

In addition, a spatial parameter may be also defined or configured as a spatial parameter set including at least one spatial parameter. Hereinafter, at least one spatial parameter is collectively referred to as a spatial parameter to simplify a description.

In the following description, a term of spatial parameter for uplink transmission may be substituted with a variety of terms such as an uplink spatial relation, an uplink transmission beam, an uplink beam, an uplink TCI state, etc. and in some examples, those terms may be used for a description instead of a spatial parameter. In addition, what is configured as default among spatial parameters for uplink transmission is referred to as a default spatial parameter, which may be substituted with a term such as a default spatial relation, a default transmission beam, a default beam, a default TCI state, etc. and in some examples, those terms may be used for a description instead of a default spatial parameter.

In the following description, uplink transmission may include transmission of a variety of uplink channels or uplink signals. For example, uplink transmission may correspond to PUSCH/PUCCH/PRACH/SRS transmission, but it is not limited thereto, and examples of the present disclosure may be also applied to a variety of uplink transmission other than a PUSCH/a PUCCH/a PRACH/a SRS.

In addition, in the present disclosure, a reference signal (RS) is used as a term which includes a physical layer signal/channel such as a synchronization signal and/or a SS/PBCH block as well as various types of RSs defined in a standard.

In addition, in the present disclosure, a pathloss RS (PL RS) associated with uplink transmission may be configured independently/individually or together/in association with a spatial parameter for uplink transmission (e.g., spatial relation info).

In examples of the present disclosure, a transmission configuration for UE-initiated uplink transmission is described by mainly considering a configuration for a spatial parameter and/or a PL RS. But, a scope of the present disclosure is not limited thereto, and examples of the present disclosure may be equally or similarly applied to a configuration for various purposes for uplink transmission.

In a currently defined wireless communication system (e.g., NR Rel-16), for UE-initiated uplink transmission (e.g., uplink transmission based on an event such as a SR, a BFRQ for SCell, a consistent LBT failure, etc.), up to 4 SR PUCCH resources may be configured for a terminal. Each SR PUCCH resource may be connected with a unique SR ID. Each SR ID may be connected with at least one logical channel and/or BFRQ, etc. Each logical channel and BFRQ may be connected with up to one SR ID and corresponding SR PUCCH resource.

Specifically, a scheduling request (SR) may be used to request an uplink-shared channel (UL-SCH) resource for new transmission.

0, 1 or a plurality of SR configurations may be configured for a MAC entity. A SR configuration may include a PUCCH resource set for a SR across different BWPs and cells. For a logical channel, SCell beam failure recovery (BFR), a consistent LBT failure, up to one PUCCH resource for a SR may be configured per BWP.

Each SR configuration may correspond to at least one logical channel and/or SCell beam failure recovery and/or consistent LBT failure. Each logical channel, each SCell BFR and each consistent LBT failure may be mapped to 0 or 1 SR configuration, which may be configured by RRC. A SR configuration of a consistent LBT failure, or SCell BFR, or a logical channel triggered by BSR other than pre-emptive BSR (buffer status report) may be considered to correspond to a SR configuration for a triggered SR (if such a configuration exists). Any SR configuration may be used for a SR triggered by pre-emptive BSR.

As described above, a normal SR may be triggered by BSR for a logical channel and BFRQ may be triggered by BFD (beam failure detection). For example, a base station may configure/allocate to a terminal a total of 2 SR PUCCH resources like SR PUCCH resource #0 connected with a logical channel and SR PUCCH resource #1 for BFRQ for a general SR. Accordingly, when data to be transmitted by a terminal occurs, uplink transmission may be performed on SR PUCCH resource #0 and when BFD occurs, uplink transmission may be performed on SR PUCCH resource #1.

In order to improve reliability of PUCCH transmission in a multi-TRP/panel environment, a method of (partitively or repetitively) transmitting a PUCCH or UCI transmitted through a PUCCH at a plurality of transmission occasions (TO) is considered. A TO may be configured with resources distinguished in at least one of a time/a frequency/a space (or a layer). For example, one PUCCH may be repetitively transmitted across a plurality of time resources (e.g., slots).

According to the existing PUCCH resource configuration, for each PUCCH resource, only one spatial relation information (or beam RS) may be configured and only one pathloss reference RS (PL reference RS or PL RS) used for uplink transmission power control may be also configured. In addition, according to the existing SR configuration, only (up to) one PUCCH resource for a predetermined event (e.g., a logical channel/BSR, a BFRQ, a consistent LBT failure, etc.) is allocated, so only one spatial relation information and PL RS are configured for a terminal for corresponding one PUCCH resource. In this case, there is uncertainty for which TRP/panel is based to configure a transmission beam and perform uplink power control for SR PUCCH transmission in a multi-TRP/panel environment. More specifically, in a multi-TRP/panel (or single-cell multi-TRP/panel) transmission environment, it is more desirable that a terminal selectively transmits a SR PUCCH for the same one purpose (e.g., one of a SR, a BFRQ and a consistent LBT failure) towards a specific TRP/panel, but in the existing method, only one spatial relation information and only one PL RS per one PUCCH resource may be configured/indicated for a terminal, so there is a problem that transmission to multi-TRPs/panels is not sufficiently supported. Accordingly, in order to improve it, a new transmission configuration method for UE-initiated uplink transmission is required.

Figure 9:
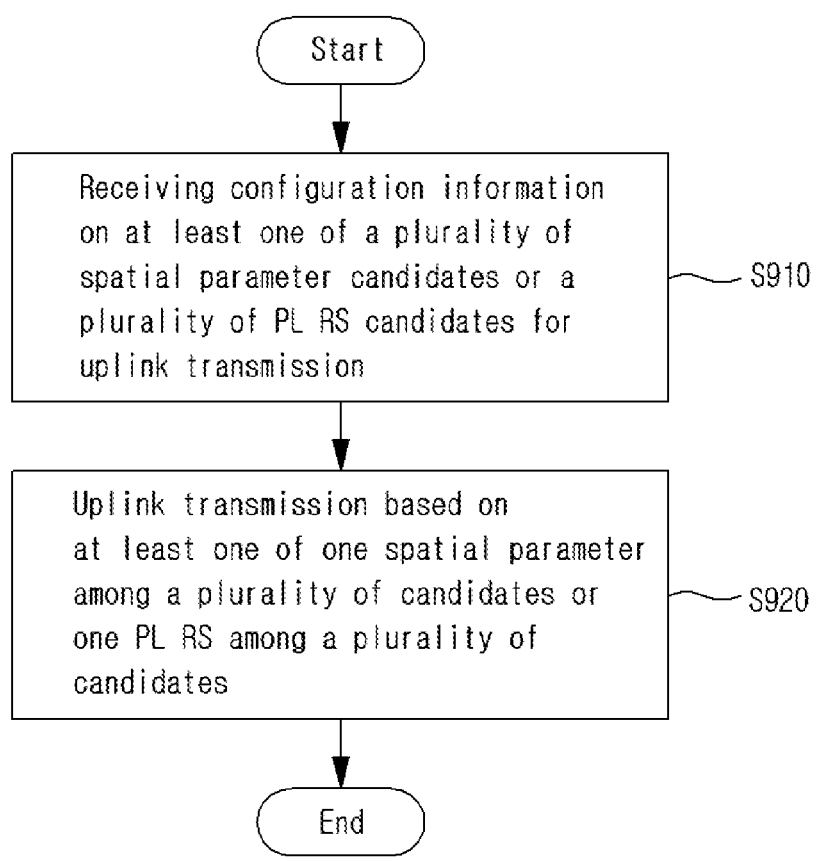
FIG. 9 is a flow chart for describing an UE-initiated uplink transmission method according to an embodiment of the present disclosure.

FIG. 9 is a flow chart for describing an UE-initiated uplink transmission method according to an embodiment of the present disclosure.

In S910, a terminal may receive configuration information for at least one of a plurality of spatial parameter candidates or a plurality of PL RS candidates for uplink transmission from a base station. Configuration information may include a plurality of spatial parameter candidates associated with each of at least one transmission occasion for uplink transmission. Alternatively, configuration information may include a plurality of pathloss reference signal (PL RS) candidates associated with each of at least one transmission occasion for uplink transmission. Alternatively, configuration information may include a plurality of spatial parameter candidates and a plurality of PL RS candidates associated with each of at least one transmission occasion for uplink transmission. In other words, at least one of a plurality of spatial parameter candidates or a plurality of PL RS candidates may be configured for a terminal at one transmission occasion. In addition, a spatial parameter may be configured to be the same as a PL RS or a connection between a spatial parameter and a PL RS may be configured. In addition, at least one transmission occasion may be mapped to each of at least one CORESET pool index, or may be mapped to each of at least one TRP, or may be mapped to each of at least one RS set.

In S920, a terminal may perform uplink transmission based on at least one of one spatial parameter or one PL RS. One spatial parameter may be selected/determined among a plurality of spatial parameter candidates. One PL RS may be selected/determined among a plurality of PL RS candidates. At least one of one spatial parameter or one PL RS may be applied to uplink transmission based on a triggering event for uplink transmission at each of at least one transmission occasion.

Through configuration information in S910, at least one of the plurality of spatial parameter candidates or the plurality of PL RS candidates may be also configured for one uplink transmission resource mapped to the triggering event. Specific examples thereof are described in Embodiment 1 by referring to FIG. 11(a).

Through configuration information in S910, at least one of the plurality of spatial parameter candidates or the plurality of PL RS candidates may be also configured for a plurality of uplink transmission resources mapped to the triggering event. In this case, each of the plurality of uplink transmission resources may be mapped to at least one of one spatial parameter or one PL RS. For example, one uplink transmission resource (e.g., a SR PUCCH resource) may be configured for one configuration identifier (e.g., a SR ID) and a plurality of configuration identifiers may be mapped to the triggering event. For example, a plurality of uplink transmission resources (e.g., a SR PUCCH resource) may be configured for one configuration identifier (e.g., a SR ID) and one configuration identifier may be mapped to the triggering event. Specific examples thereof are described in Embodiment 2 by referring to FIG. 11(b).

In S920, a predetermined standard may be applied in selecting/determining one spatial parameter applied to a specific transmission occasion among the plurality of spatial parameter candidates or in selecting/determining one PL RS applied to a specific transmission occasion among the plurality of PL RS candidates. A predetermined standard may include at least one of quality, order, a group or BFD. Specific examples thereof are described in Embodiment 1 and Embodiment 2 below.

In S920, a triggering event may include at least one of a logical channel, buffer status report (BSR), a beam failure recovery request (BFRQ), or a consistent LBT (listen-before-talk) failure. In addition, similar to a BFRQ determined based on predetermined quality for a BFD RS, a radio link failure (RLF) event based on timer expiration for radio problem/measurement report, a random access process failure, a RLC failure, a consistent LBT failure, etc. may be also included in a predetermined triggering event.

UE-initiated uplink transmission in S920 may include transmission of various uplink information/signals/data such as a SR, HARQ-ACK, a CSI, a random access preamble, a SRS, configured grant based transmission, etc. In addition, the UE-initiated uplink transmission may be transmitted through a variety of uplink channels such as a PUCCH, a PUSCH, a PRACH, etc.

Figure 10:
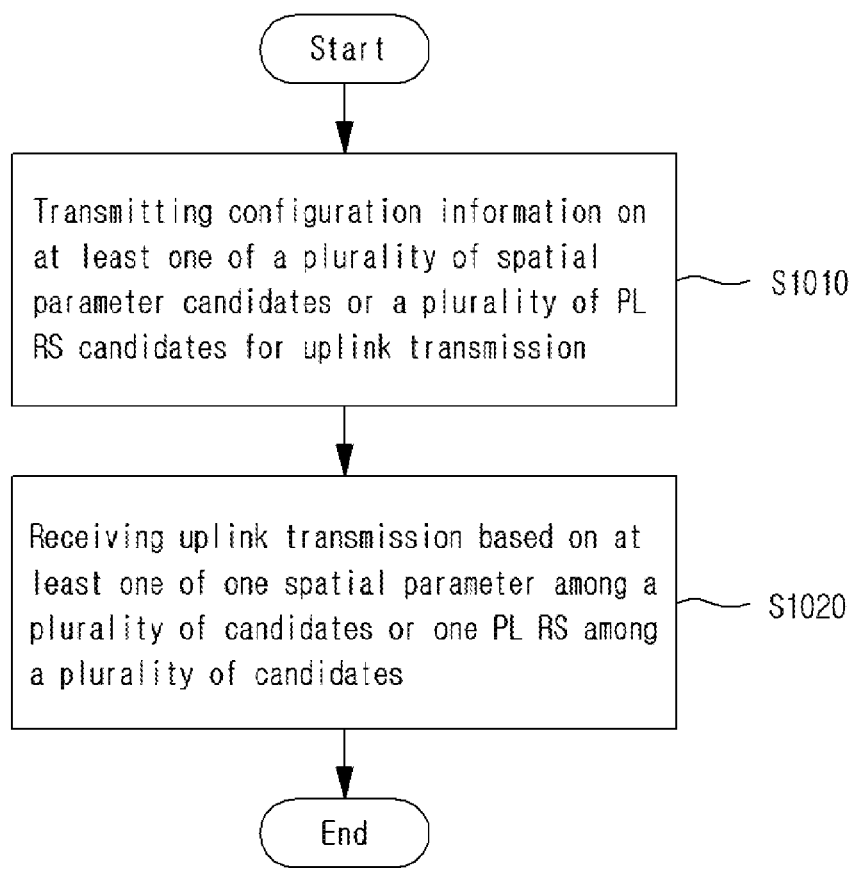
FIG. 10 is a flow chart for describing an UE-initiated uplink reception method according to an embodiment of the present disclosure.

FIG. 10 is a flow chart for describing an UE-initiated uplink reception method according to an embodiment of the present disclosure.

In S1010, a base station may transmit to a terminal configuration information on at least one of a plurality of spatial parameter candidates or a plurality of PL RS candidates for uplink transmission. Configuration information may include the same information as described in S910 of FIG. 9.

In S1020, a base station may receive uplink transmission based on at least one of one spatial parameter or one PL RS from a terminal. One spatial parameter/one PL RS selected/determined by a terminal is the same as described in S920 of FIG. 9.

Specific examples of an UE-initiated uplink transmission method according to the present disclosure described by referring to FIG. 9 are described below.

Hereinafter, for clarity of a description, SR PUCCH transmission is assumed as an example of UE-initiated uplink transmission, at least one of a logical channel/BSR, a BFRQ or a consistent LBT failure is assumed as an event triggering UE-initiated uplink transmission and a SR PUCCH resource and a SR ID are assumed as an identifier identifying a resource which is preconfigured for UE-initiated uplink transmission and a corresponding resource. A scope of the present disclosure is not limited to such an example, and includes a variety of examples that an uplink transmission resource and a resource identifier are preconfigured for predetermined UE-initiated uplink transmission triggered by a predetermined event. For example, in the following description, a term of SR PUCCH resource may mean a PUCCH resource configured for a SR ID configured for various purposes such as a BFRQ or a consistent LBT failure, etc. as well as for a SR purpose for data transmission.

Embodiment 1

Figure 11:
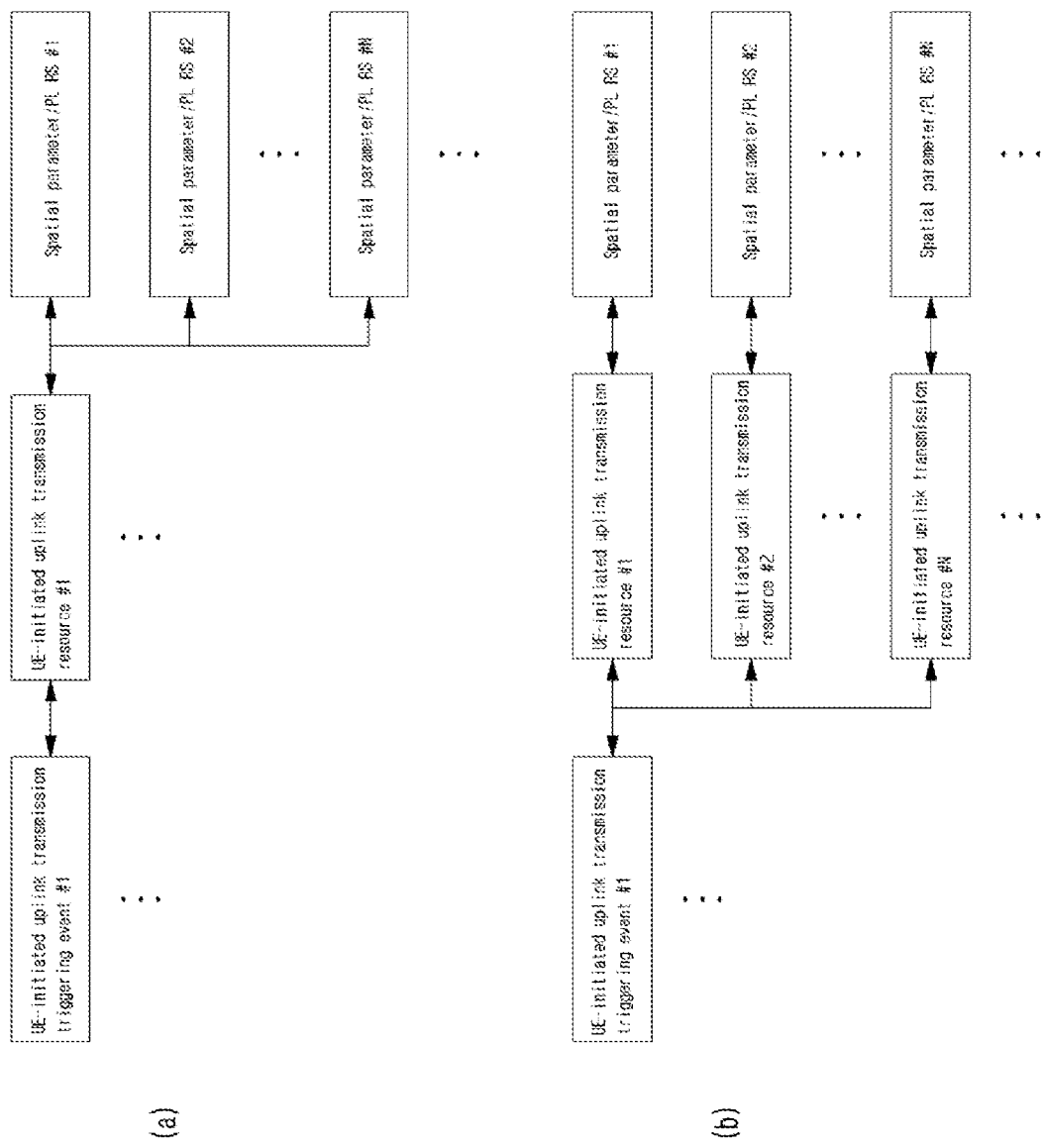
FIG. 11 is a diagram for describing a transmission configuration for UE-initiated uplink transmission according to the present disclosure.

FIG. 11 is a diagram for describing a transmission configuration for UE-initiated uplink transmission according to the present disclosure.

As described in FIG. 11, according to the present disclosure, for UE-initiated uplink transmission, a plurality of spatial parameters and/or a plurality of PL RSs (hereinafter, a plurality of spatial parameters/PL RSs) may be configured for a terminal for one UE-initiated uplink transmission triggering event. To this end, in this embodiment, a plurality of spatial parameters/PL RSs may be configured for one UE-initiated uplink transmission resource as in FIG. 11(a). In an example of FIG. 11(a), only one triggering event is shown, but additional triggering event(s) may be further configured for a terminal. In addition, in an example of FIG. 11(a), only one SR PUCCH resource configured for one triggering event is shown, but additional triggering event(s), each additional SR PUCCH resource for each of the additional triggering event(s), and at least one spatial parameter/PL RS for each of the additional SR PUCCH resources may be further configured for a terminal (but, a different triggering event may be mapped to the same one SR PUCCH resource).

Specifically, a base station may configure a plurality of spatial parameters and/or a plurality of PL reference RSs for a SR PUCCH resource. In other words, unlike the existing method that one spatial parameter/PL RS is configured for one SR PUCCH resource, a plurality of spatial parameters/PL RSs may be configured for one SR PUCCH resource. In addition, at least one SR PUCCH resource may be configured for a terminal and a plurality of spatial parameters/PL RSs may be configured for each of all or part of SR PUCCH resources among the at least one SR PUCCH resource. Here, a PL RS may be configured to be the same as a spatial parameter and although a PL RS and a spatial parameter are different, a connection/a mapping relation between them may be configured. A plurality of spatial parameters/PL RSs configured for such one SR PUCCH resource may be configured for a terminal through higher layer signaling (e.g., RRC and/or MAC CE signaling).

In addition, one SR PUCCH resource may be configured for one SR ID and at least one triggering event (e.g., a logical channel/BSR, a BFRQ, a consistent LBT failure, etc.) may be configured for one SR ID (or one SR PUCCH resource). In addition, up to one SR ID (or one SR PUCCH resource) may be configured for one triggering event. Accordingly, when a specific triggering event occurs, one SR ID and one SR PUCCH resource may be specified.

Accordingly, when a specific triggering event (e.g., a SR event) occurs, one SR ID and one SR PUCCH resource may be specified and one of a plurality of spatial parameters/PL RSs configured for corresponding one SR PUCCH resource may be applied in a specific TO. If PUCCH transmission is performed in a plurality of TOs, one of the plurality of spatial parameters/PL RSs may be applied in each TO. One spatial parameter/PL RS applied to each of at least one TO may be selected/determined according to a predetermined method.

According to embodiment 1, a plurality of RSs for a plurality of TRPs/panels (e.g., DL RSs, UL RSs, or DL RS(s) and UL RS(s)) may be preconfigured as beam RSs (or spatial parameters) and/or PL RSs for one SR PUCCH resource, and (the same or different) one RS of a plurality of RSs may be applied selectively or alternately in at least one TO.

A variety of examples for a standard that a terminal selects/determines a spatial parameter/a PL RS applied to each of at least one TO may be applied. For example, a spatial parameter/a PL RS which will be applied to a specific TO may be defined based on at least one of quality, order, a group, or BFD. Specific examples are as follows.

For example, a terminal may select/determine a spatial parameter/a PL RS with higher (L1 or L3)-RSRP.

Additionally or alternatively, a terminal may select/determine a spatial parameter/a PL RS with higher (L1 or L3)-SINR.

Additionally or alternatively, a terminal may alternately select/determine a spatial parameter/a PL RS according to order configured by a base station or a rule determined per each TO. For example, a plurality of spatial parameters/PL RSs may be applied/mapped to a plurality of TOs in a cyclic shift form. For example, a first spatial parameter/PL RS may be selected/applied in an odd-numbered TO and a second spatial parameter/PL RS may be selected/applied in an even-numbered TO. For example, a specific spatial parameter/PL RS may be selected/applied in ascending order or descending order of IDs/indexes of a spatial parameter/a PL RS in order of TOs.

Additionally or alternatively, when BFD is performed for each TRP (or CORESET pool/set), a spatial parameter/a PL RS (or a spatial parameter set/a PL RS set) which will be used for each TRP (or CORESET pool/set) may be connected/configured for a SR PUCCH resource. Accordingly, when BFD occurs in a specific TRP (or CORESET pool/set), it may be defined to apply a spatial parameter/a PL RS (or a spatial parameter set/a PL RS set) connected/configured for a corresponding TRP (or CORESET pool/set) or selectively/alternately apply one of them. For example, when BFD occurs in a specific CORESET, a spatial parameter/a PL RS (or a spatial parameter set/a PL RS set) connected/ corresponding to a CORESET pool/set index to which a corresponding CORESET belongs may be selected. Alternatively, a TRP/a CORESET that BFD occurred may also have bad uplink quality, so a spatial parameter/a PL RS (or a spatial parameter set/a PL RS set) connected/corresponding to a TRP/a CORESET that BFD did not occur may be selected.

Here, whether BFD occurs in a specific TRP/CORESET may be determined based on quality of a BFD RS, not a spatial parameter/a PL RS. For example, when a hypothetical BLER measured based on a BFD RS associated with a specific TRP/CORESET (or associated with spatial parameter(s)/PL RS(s) corresponding to a TRP/a CORESET) is equal to or greater than a predetermined threshold value, it may be determined that BFD occurred and when it is less than a predetermined threshold value, it may be determined that BFD did not occur.

Additionally or alternatively, a TRP/a CORESET that BFD occurred or did not occurred may be relatively determined. For example, spatial parameter(s)/PL RS(s) corresponding to a corresponding TRP/CORESET may be selected based on a first TRP/CORESET when first quality (e.g., a first hypothetical BLER) measured based on a first BFD RS associated with a first TRP/CORESET (or associated with first spatial parameter(s)/PL RS(s) corresponding to a first TRP/CORESET) is higher than second quality (e.g., a second hypothetical BLER) measured based on a second BFD RS associated with a second TRP/CORESET (or associated with second spatial parameter(s)/PL RS(s) corresponding to a second TRP/CORESET) and otherwise, based on a second TRP/CORESET.

In the above-described examples, a TRP/CORESET pool may be also replaced with a CORESET or a CORESET set. In other words, when BFD occurred only in at least one CORESET of all CORESETs, a SR PUCCH may be transmitted to inform a base station of occurrence of a corresponding event and also in this case, a spatial parameter/a PL RS (or a spatial parameter set/a PL RS set) which will be used may be configured/connected in advance per each CORESET or CORESET set. Accordingly, when a specific CORESET/CORESET set is a BFD situation, a spatial parameter/a PL RS (or a spatial parameter set/a PL RS set) connected/configured for a corresponding CORESET/ CORESET set (or other CORESET/CORESET set excluding a corresponding CORESET/CORESET set) may be selected. When a plurality of spatial parameters/PL RSs are selected, it may be defined to use any one of them selectively or alternately.

Embodiment 2

As described in FIG. 11, according to the present disclosure, for UE-initiated uplink transmission, a plurality of spatial parameters and/or a plurality of PL RSs (hereinafter, a plurality of spatial parameters/PL RSs) may be configured for a terminal for one UE-initiated uplink transmission triggering event. For it, in this embodiment, a plurality of UE-initiated uplink transmission resources may be configured for one UE-initiated uplink transmission triggering event and one spatial parameter/PL RS may be configured for each UE-initiated uplink transmission resource as in FIG. 11(b). Only one triggering event is shown in an example of FIG. 11(b), but additional triggering event(s), at least one additional SR PUCCH resource for each of the additional triggering event(s), and one spatial parameter/PL RS for each of the at least one additional SR PUCCH resource may be further configured for a terminal (but, a different triggering event may be mapped to at least one same SR PUCCH resource(s)).

Specifically, a base station may configure a plurality of SR PUCCH resources for one UE-initiated uplink transmission triggering event (e.g., a logical channel/BSR, a BFRQ, or a consistent LBT failure, etc.). In other words, unlike the existing method that up to one SR PUCCH resource is configured for one triggering event, a plurality of SR PUCCH resources may be configured for one triggering event. In addition, at least one UE-initiated uplink transmission triggering event may be configured for a terminal and a plurality of SR PUCCH resources may be configured for each of all or part of events among the at least one triggering event. A plurality of SR PUCCH resources configured for such one triggering event may be configured for a terminal through higher layer signaling (e.g., RRC and/or MAC CE signaling).

In addition, one spatial parameter/PL RS may be configured for one SR PUCCH resource. Here, a PL RS may be configured to be the same as a spatial parameter and although a PL RS and a spatial parameter are different, a connection/mapping relation between them may be configured.

As an example in which a plurality of SR PUCCH resources are configured for one triggering event, one SR PUCCH resource may be configured for one SR ID and at least one triggering event may be configured for one SR ID. In addition, a plurality of SR IDs (i.e., a plurality of SR PUCCH resources) may be configured for one triggering event.

Additionally or alternatively, a plurality of SR PUCCH resources may be configured for one SR ID and at least one triggering event may be configured for one SR ID. In addition, one SR ID (i.e., a plurality of SR PUCCH resources) may be configured for one triggering event.

Accordingly, when a specific triggering event (e.g., a SR event) occurs, a plurality of SR PUCCH resources configured for a corresponding triggering event may be specified. Here, one spatial parameter/PL RS is configured for each of a plurality of SR PUCCH resources, so if any one of the plurality of SR PUCCH resources is specified, one spatial parameter/PL RS may be specified and accordingly, the one spatial parameter/PL RS may be applied in a specific TO. If PUCCH transmission is performed in a plurality of TOs, one of the plurality of SR PUCCH resources (accordingly, one spatial parameter/PL RS) may be applied in each TO. One SR PUCCH resource (i.e., one spatial parameter/PL RS) applied to each of at least one TO may be selected/determined according to a predetermined method.

According to Embodiment 2, a plurality of SR PUCCH resources may be configured for each triggering event, one RS (e.g., a DL RS or an UL RS) for one TRP/panel may be preconfigured as a beam RS (or a spatial parameter) and/or a PL RS for each of the plurality of SR PUCCH resources and (the same or different) one SR PUCCH resource (one resulting spatial parameter/PL RS) of a plurality of SR PUCCH resources may be selectively or alternately applied in at least one TO.

A variety of examples for a standard that a terminal selects/determines a SR PUCCH resource applied to each of at least one TO may be applied. For example, a spatial parameter/a PL RS which will be applied to a specific TO may be defined based on at least one of quality, order, a group, or BFD. Specific examples are as follows.

For example, a terminal may select/determine a SR PUCCH resource corresponding to a spatial parameter/a PL RS with higher (L1 or L3)-RSRP.

Additionally or alternatively, a terminal may select/determine a SR PUCCH resource corresponding to a spatial parameter/a PL RS with higher (L1 or L3)-SINR.

Additionally or alternatively, a terminal may alternately select/determine a SR PUCCH resource according to order configured by a base station or a rule determined per TO. For example, a plurality of SR PUCCH resources may be applied/mapped to a plurality of TOs in a cyclic shift form. For example, a first SR PUCCH resource may be selected/applied in an odd-numbered TO and a second SR PUCCH resource may be selected/applied in an even-numbered TO. For example, a specific SR PUCCH resource may be selected/applied in ascending order or descending order of IDs/indexes of a SR PUCCH resource in order of TOs.

Additionally or alternatively, when BFD is performed for each TRP (or CORESET pool/set), SR PUCCH resource(s) which will be used for each TRP (or CORESET pool/set) may be connected/configured. Accordingly, when BFD occurs in a specific TRP (or CORESET pool/set), it may be defined to apply SR PUCCH resource(s) connected/configured for a corresponding TRP (or CORESET pool/set) or selectively/alternately apply one of them. For example, when BFD occurs in a specific CORESET, SR PUCCH resource(s) connected/corresponding to a CORESET pool/set index to which a corresponding CORESET belongs may be selected. Alternatively, a TRP/a CORESET that BFD occurred may also have bad uplink quality, so SR PUCCH resource(s) connected/corresponding to a TRP/a CORESET that BFD did not occur may be selected.

Here, whether BFD occurs in a specific TRP/CORESET may be determined based on quality of a BFD RS, not a spatial parameter/a PL RS. For example, when a hypothetical BLER measured based on a BFD RS associated with a specific TRP/CORESET (or associated with SR PUCCH resource(s) for a TRP/a CORESET) is equal to or greater than a predetermined threshold value, it may be determined that BFD occurred and when it is less than a predetermined threshold value, it may be determined that BFD did not occur.

Additionally or alternatively, a TRP/a CORESET that BFD occurred or did not occur may be relatively determined. For example, SR PUCCH resource(s) corresponding to a corresponding TRP/CORESET may be selected based on a first TRP/CORESET when first quality (e.g., a first hypothetical BLER) measured based on a first BFD RS associated with a first TRP/CORESET (or associated with SR PUCCH resource(s) corresponding to a first TRP/CORESET) is higher than second quality (e.g., a second hypothetical BLER) measured based on a second BFD RS associated with a second TRP/CORESET (or associated with second SR PUCCH resource(s) corresponding to a second TRP/CORESET) and otherwise, based on a second TRP/CORESET.

In the above-described examples, a TRP/CORESET pool may be also replaced with a CORESET or a CORESET set. In other words, when BFD occurred only in at least one CORESET of all CORESETs, a SR PUCCH may be transmitted to inform a base station of occurrence of a corresponding event and also in this case, SR PUCCH resource(s) which will be used may be configured/connected in advance per each CORESET or CORESET set. Accordingly, when a specific CORESET/CORESET set is a BFD situation, SR PUCCH resource(s) connected/configured for a corresponding CORESET/CORESET set (or other CORESET/CORESET set excluding a corresponding CORESET/CORESET set) may be selected. When a plurality of SR PUCCH resources are selected, it may be defined to use any one of them selectively or alternately.

Contrary to embodiment 1, embodiment 2 may individually configure a PE position/a PUCCH format, etc. of a PUCCH resource which will be received by each TRP. Accordingly, embodiment 2 may support more flexible PUCCH transmission than embodiment 1 for a variety of MTRP environments, while it is required to preconfigure more PUCCH resources. But, in a single-cell multi-TRP/panel environment, which TRP/panel among each TRP/panel receives a corresponding PUCCH may not matter, and in such an environment, it may be allowed to repetitively configure a PUCCH with the same RE position/symbol position/PUCCH format, etc. to reduce an overhead of a PUCCH resource configuration. For example, a plurality of PUCCH resources are configured for a specific triggering event (e.g., a logical channel/BSR, a BFRQ, a consistent LBT failure, etc.), but at least one of a RE position/a symbol position/a PUCCH format, etc. is the same for the plurality of PUCCH resources and at least a spatial parameter/a PL RS may be allowed to be configured differently.

The above-described embodiment 1 and 2 may be also applied to one TO or a single TRP. In this case, a terminal may select one of a plurality of spatial parameters/PL RSs or a plurality of PUCCH resources configured for a terminal according to a predetermined standard and apply it to PUCCH transmission in a corresponding TO.

In the above-described embodiment 1 and 2, a method of configuring a plurality of spatial parameters/PL RSs for one triggering event may be applied only to a spatial parameter or a PL RS. For example, only a plurality of spatial parameters may be configured for one triggering event and a configuration for a PL RS may not be provided for a terminal. Alternatively, only a plurality of PL RSs may be configured for one triggering event and a configuration for a spatial parameter may not be provided for a terminal. In this case, based on a relation between a spatial parameter and a PL RS (e.g., a spatial parameter and a PL RS may be predefined/preconfigured as the same DL RS), a terminal may determine the other one based on a configuration for any one of a spatial parameter and a PL RS. For example, when embodiment 1 or embodiment 2 is applied only to a PL RS and a spatial parameter is not configured for a corresponding SR PUCCH resource, an additional rule may be defined to apply (the same DL RS) as a spatial parameter according to a PL RS selected/determined by a terminal. Conversely, that is, when embodiment 1 or embodiment 2 is applied only to a spatial parameter and a PL RS is not configured for a corresponding SR PUCCH resource, an additional rule may be defined to apply (the same DL RS) as a PL RS according to a spatial parameter selected/determined by a terminal.

In the above-described embodiment 1 and embodiment 2, it was described by assuming a SR PUCCH for clarity of a description, but a spatial parameter/a PL RS may be also applied to a PUCCH resource for other purpose (e.g., HARQ-ACK PUCC/CSI PUCCH, etc.) or other UL channel/resource/signal other than a PUCCH (e.g., a SRS/a PRACH/a PUSCH, etc.) according to the above-described examples. For example, in a multi-TRP/panel environment, a plurality of spatial parameters/PL RSs may be configured for each PRACH resource for a BFRQ purpose, and a terminal may select a specific parameter/PL RS of them according to a predetermined standard and apply it to PRACH transmission in a specific TO.

The above-described examples may be applied to a variety of UE-initiated uplink transmission performed when a specific triggering event occurs in a terminal (e.g., a BFR PRACH, a configured grant PUSCH, a SR/BFR PUCCH). In addition, the above-described examples may be applied to both uplink transmission transmitted by an indication/control/scheduling of a base station and a case in which a spatial parameter/a PL RS which will be applied to uplink transmission in a specific TO is not explicitly configured/indicated.

Figure 12:
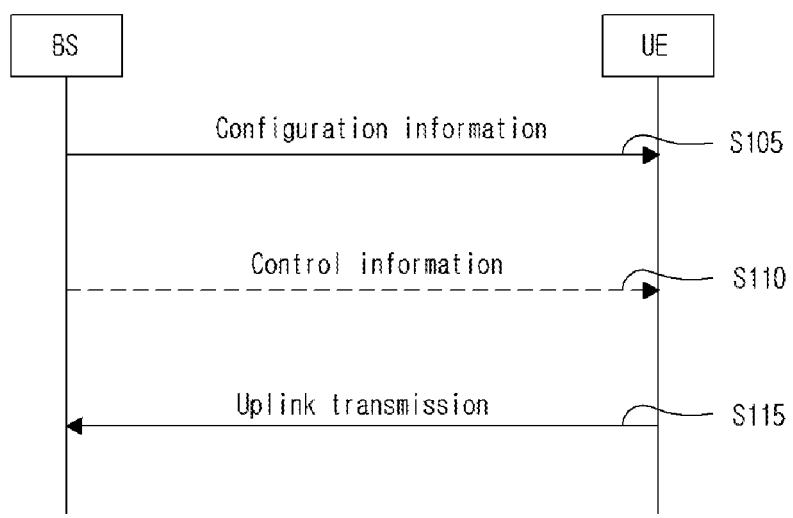
FIG. 12 is a diagram illustrating a signaling procedure between a base station and a terminal for an uplink transmission and reception method according to an embodiment of the present disclosure.

FIG. 12 is a diagram illustrating a signaling procedure between a base station and a terminal for an uplink transmission and reception method according to an embodiment of the present disclosure.

FIG. 12 represents signaling between a base station (BS) and a terminal (UE) to which embodiment 1/embodiment 2 according to the present disclosure may be applied. Here, UE/a base station is just an example and may be applied by being substituted with a variety of devices as in FIG. 13. FIG. 12 is just for convenience of a description, and it does not limit a scope of the present disclosure. In addition, some step(s) shown in FIG. 12 may be omitted according to a situation and/or a configuration, etc.

A base station may generally mean an object which performs transmission and reception of data with a terminal. For example, the base station may be a concept which includes at least one TP (Transmission Point), at least one TRP (Transmission and Reception Point), etc. In addition, a TP and/or a TRP may also include a panel, a transmission and reception unit, etc. of a base station.

In addition, a TRP may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., an index, an ID). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.).

UE may receive configuration information from a base station S105. In other words, a base station may transmit configuration information to UE. The configuration information may be transmitted through higher layer signaling (e.g., RRC signaling, a MAC-CE, etc.). In addition, when the configuration information is predefined or preconfigured, a corresponding step may be omitted.

For example, the configuration information may include configuration information related to MTRP transmission described in the above-described embodiment 1/embodiment 2. For example, the configuration information may include configuration information/TCI state-related configuration information, etc. for a CORESET/a CORESET group/a CORESET pool for multi-TRP transmission and reception. For example, the configuration information may include a SR configuration described in the above-described embodiment 1/embodiment 2 (or a transmission configuration for UE-initiated uplink transmission).

For example, the SR configuration (or transmission configuration for UE-initiated uplink transmission) may include a SR PUCCH resource configuration as described in the above-described embodiment 1/embodiment 2. For example, a plurality of spatial parameters/PL RSs may be configured by corresponding to the SR PUCCH resource. For example, a plurality of SR PUCCH resources may be configured per SR usage/purpose (or triggering event, e.g., a logical channel/BSR, a BFRQ, a consistent LBT failure, etc.).

For example, the above-described operation that UE in S105 (100/200 in FIG. 13) receives the configuration information from a base station (200/100 in FIG. 13) may be implemented by a device in FIG. 13 which will be described below. For example, in reference to FIG. 13, at least one processor 102 may control at least one transceiver 106 and/or at least one memory 104, etc. to receive the configuration information and at least one transceiver 106 may receive the configuration information from a base station.

UE may receive control information from a base station S110. In other words, a base station may transmit control information to UE. For example, the control information may be transmitted through a control channel (e.g., a PDCCH, etc.). For example, the control information may include (indication) information on a TCI state (e.g., a TCI field)/resource allocation information on the TCI state (e.g., bandwidth)/resource allocation information for uplink channel (e.g., PUCCH/PUSCH) transmission and reception (i.e., a space/frequency/time resource), etc.

For example, the above-described operation that UE (100/200 in FIG. 13) in S110 receives the control information from a base station (200/100 in FIG. 13) may be implemented by a device in FIG. 13 which will be described below. For example, in reference to FIG. 13, at least one processor 102 may control at least one transceiver 106 and/or at least one memory 104, etc. to receive the control information and at least one transceiver 106 may receive the control information from a base station.

UE may perform uplink transmission (e.g., PUCCH/PUSCH transmission) to a base station S115. In other words, a base station may receive uplink transmission (e.g., a PUCCH/a PUSCH) from UE. For example, the uplink transmission may be repetitively transmitted in a plurality of TOs (transmission occasion).

For example, as described in the above-described embodiment 1/embodiment 2, when a specific triggering event (e.g., a SR event) occurs in a terminal, a PUCCH may be transmitted. For example, the specific triggering event (e.g., a SR event) may include a logical channel/BSR, a BFRQ, a consistent LBT failure, etc. For example, based on the above-described embodiment 1/embodiment 2, a PUCCH resource/a spatial parameter/a PL RS for the PUCCH transmission may be determined. For example, one of a plurality of spatial parameters/PL RSs/PUCCH resources may be selected based on quality (e.g., L1/L3-RSRP/SINR) or a PUCCH may be transmitted based on a plurality of spatial parameters/PL RSs/PUCCH resources selected in a corresponding TO. For example, a spatial parameter/a PL RS which will be applied in a PUCCH TO may be sequentially determined based on predetermined order (e.g., ascending order/descending order of IDs/indexes associated with a PUCCH resource/a spatial parameter/a PL RS). For example, one of a plurality of SR PUCCH resources/spatial parameters/PL RSs may be selected based on a group/BFD. For example, a PUCCH resource/a spatial parameter/a PL RS corresponding to a CORESET pool/group index of a CORESET associated with occurrence of a specific triggering event may be selected.

For example, the above-described operation that UE (100/200 in FIG. 13) in S115 performs the uplink transmission to a base station (200/100 in FIG. 13) may be implemented by a device in FIG. 13 which will be described below. For example, in reference to FIG. 13, at least one processor 102 may control at least one transceiver 106 and/or at least one memory 104, etc. to transmit the uplink channel and at least one transceiver 106 may transmit the uplink channel to a base station.

As described above, the above-described base station/UE signaling and operation (e.g., embodiment 1/embodiment 2/FIG. 12, etc.) may be implemented by a device (e.g., a device in FIG. 13) which will be described below. For example, a base station may correspond to a first wireless device and UE may correspond to a second wireless device and in some cases, the opposite may be considered.

Figure 13:
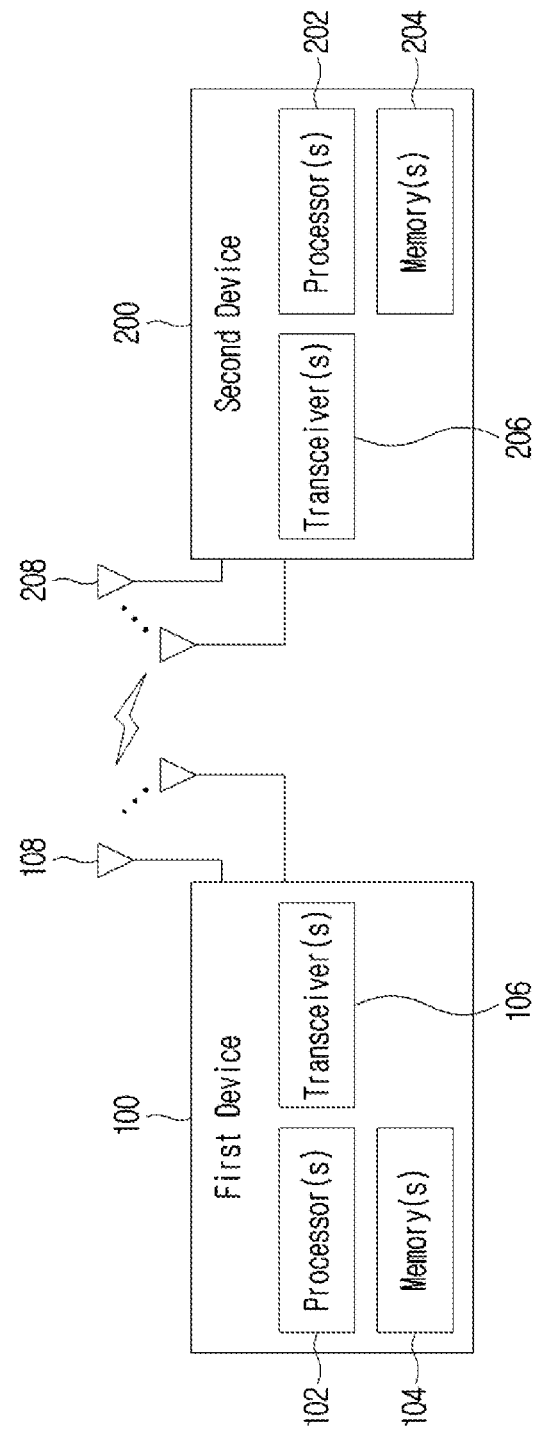
FIG. 13 illustrates a block diagram of a wireless communication system according to an embodiment of the present disclosure.

For example, the above-described base station/UE signaling and operation (e.g., embodiment 1/embodiment 2/FIG. 12, etc.) may be processed by at least one processor in FIG. 13 (e.g., 102, 202) and the above-described base station/UE signaling and operation (e.g., embodiment 1/embodiment 2/FIG. 12, etc.) may be stored in a memory (e.g., at least one memory 104, 204 in FIG. 13) in a command/program form (e.g., an instruction, an executable code) for driving at least one processor in FIG. 13 (e.g., 102, 202).

General Device to which the Present Disclosure May be Applied

FIG. 13 is a diagram which illustrates a block diagram of a wireless communication system according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:
receiving, from a base station, configuration information including multiple uplink transmission resources including a first uplink transmission resource for a triggering event related to a first control resource set (CORESET) group of a serving cell and not for a triggering event related to a second CORESET group of the serving cell, and a second uplink transmission resource for a triggering event related to a second CORESET group of the serving cell and not for the triggering event related to the first CORESET group of the serving cell;
based on the triggering event related to the first CORESET group of the serving cell, performing an uplink transmission to the base station on the first uplink transmission resource; and
based on the triggering event related to the second CORESET group of the serving cell, performing the uplink transmission to the base station on the second uplink transmission resource.

2. The method of claim 1, wherein:
the at least one of multiple spatial parameter candidates or multiple pathloss reference signal (PL RS) candidates are configured related to the multiple uplink transmission resources,
each of the multiple uplink transmission resources is mapped to at least one of a spatial parameter or a PL RS.

3. The method of claim 2, wherein:
an uplink transmission resource is configured for a configuration identifier, and multiple configuration identifiers are mapped to the triggering event.

4. The method of claim 2, wherein:
the spatial parameter includes at least one of spatial relation information for the uplink transmission, spatial relation reference signal (RS), uplink transmission configuration indicator (TCI) state, beam RS, or quasi co-location (QCL) reference RS.

5. The method of claim 1, wherein:
the triggering event is related to beam failure recovery,
the uplink transmission based on the first uplink transmission resource is triggered by the beam failure recovery for the first CORESET group, and
the uplink transmission based on the second uplink transmission resource is triggered by the beam failure recovery for the second CORESET group.

6. The method of claim 1, wherein:
the triggering event includes at least one of logical channel, buffer status report (BSR), beam failure recovery request (BFRQ), or consistent listen-before-talk (LBT) failure.

7. The method of claim 1, wherein:
the uplink transmission includes transmission of at least one of scheduling request (SR), hybrid automatic repeat request-acknowledgment (HARQ-ACK), channel state information (CSI), random access preamble, sounding reference signal (SRS), configured grant based data, physical uplink control channel (PUCCH), physical uplink shared channel (PUSCH), or physical random access channel (PRACH).

8. A terminal in a wireless communication system, the terminal comprising:
at least one transceiver; and
at least one processor connected to the at least one transceiver, wherein the at least one processor is configured to:
  receive, through the at least one transceiver from a base station, configuration information including multiple uplink transmission resources including a first uplink transmission resource for a triggering event related to a first control resource set (CORESET) group of a serving cell and not for a triggering event related to a second CORESET group of the serving cell, and a second uplink transmission resource for a triggering event related to a second CORESET group of the serving cell and not for the triggering event related to the first CORESET group of the serving cell;
  based on the triggering event related to the first CORESET group of the serving cell, perform an uplink transmission through the at least one transceiver to the base station on a on the first uplink transmission resource; and
  based on the triggering event related to the second CORESET group of the serving cell, perform the uplink transmission to the base station on the second uplink transmission resource.

9. A base station in a wireless communication system, the base station comprising:
at least one transceiver; and
at least one processor connected to the at least one transceiver,
wherein the at least one processor is configured to:
transmit, to a terminal through the at least one transceiver, configuration information including multiple uplink transmission resources including a first uplink transmission resource for a triggering event related to a first control resource set (CORESET) group of a serving cell and not for a triggering event related to a second CORESET group of the serving cell, and a second uplink transmission resource for a triggering event related to a second CORESET group of the serving cell and not for the triggering event related to the first CORESET group of the serving cell;
based on the triggering event related to the first CORESET group of the serving cell, receive an uplink transmission from the terminal through the at least one transceiver on the first uplink transmission resource; and
based on the triggering event related to the second CORESET group of the serving cell, receive the uplink transmission from the terminal through the at least one transceiver on the second uplink transmission resource.

\* \* \* \* \*